United States Patent
Gerlach

Patent Number: 5,144,646
Date of Patent: Sep. 1, 1992

[54] X-RAY DIAGNOTICS INSTALLATION WITH BRIGHTNESS CONTROLLED BY A DOMINANT REGION OF THE IMAGE

[75] Inventor: Hans-Juergen Gerlach, Erlangen, Fed. Rep. of Germany

[73] Assignee: Siemens Aktiengesellschaft, Munich, Fed. Rep. of Germany

[21] Appl. No.: 773,539

[22] Filed: Oct. 9, 1991

[30] Foreign Application Priority Data

Jan. 28, 1991 [DE] Fed. Rep. of Germany ....... 4102445

[51] Int. Cl.⁵ .............................................. H05G 1/64
[52] U.S. Cl. ....................................... 378/99; 378/97; 378/108
[58] Field of Search ............................ 378/99, 108, 97

[56] References Cited

U.S. PATENT DOCUMENTS 4,982,418  1/1991  Kuehnel ................................ 378/99
5,029,338  7/1991  Archenger ............................ 378/99
5,067,142  11/1991  Gallet .................................. 378/99

Primary Examiner—Craig E. Church
Attorney, Agent, or Firm—Hill, Van Santen, Steadman & Simpson

[57] ABSTRACT

An x-ray diagnostics installation has an image intensifier video chain with a detector for obtaining an actual value of the brightness of a dominant region within the image at the output screen of the x-ray image intensifier, this actual value being compared with a rated value for controlling the overall brightness of the image. For this purpose, the output image of x-ray image intensifier is directed onto a chip having electrically driveable micromirrors, which can be individually driven, so that by selected individual drive of the micromirrors the individual micromirrors can be oriented as needed to direct a selectable image portion onto a light detector, for use in controlling the brightness.

2 Claims, 1 Drawing Sheet

X-RAY DIAGNOTICS INSTALLATION WITH BRIGHTNESS CONTROLLED BY A DOMINANT REGION OF THE IMAGE

BACKGROUND OF THE INVENTION

1. Field of the Invention

The present invention is directed to an x-ray diagnostics installation having an image intensifier video chain and means for detecting the average image brightness in a region of the image for controlling operation of the x-ray tube.

2. Description of the Prior Art

X-ray systems are known in the art wherein a selected portion, known as the dominant region, or simply the dominant, of the output image of the x-ray image intensifier is imaged onto a detector from which the average image brightness of that region is determined. The average image brightness can then be used for controlling operation of the x-ray tube to select the exposure time and to control the average image brightness in the region.

It is known to construct the detector of a matrix of photoelements, selected photoelements being activated in order to obtain a defined geometrical arrangement for forming an output signal, in accord with the desired dominant for brightness control and/or automatic deactivation of an x-ray exposure. Such a matrix, however, constitutes a relatively complicated and expensive structure.

SUMMARY OF THE INVENTION

It is an object of the present invention to provide a detector for use in the image intensifier video chain of an x-ray diagnostics installation for acquiring a signal used to control the operation of an x-ray tube which is more rugged and more simplified than known structures.

The above object is achieved in accordance with the principles of the present invention in an x-ray diagnostics installation wherein the output image of the x-ray image intensifier is directed onto a chip having a plurality of electrically driveable micromirrors which can be individually driven, so that a selectable image portion can be imaged onto a light detector. The dominant, i.e., the selectable image excerpt, can be selected by appropriate drive of individual ones of the micromirrors. Such a chip having micromirrors is described, for example, in the periodical "Elektronik," Vol. 22, Oct. 26, 1990, pages 122–126. Such a chip can be manufactured as a mass-produced article, because it can be employed not only in x-ray technology, but also, for example, in telecommunications, so that an economical solution can be achieved.

DESCRIPTION OF THE PREFERRED EMBODIMENTS

Figure 1:
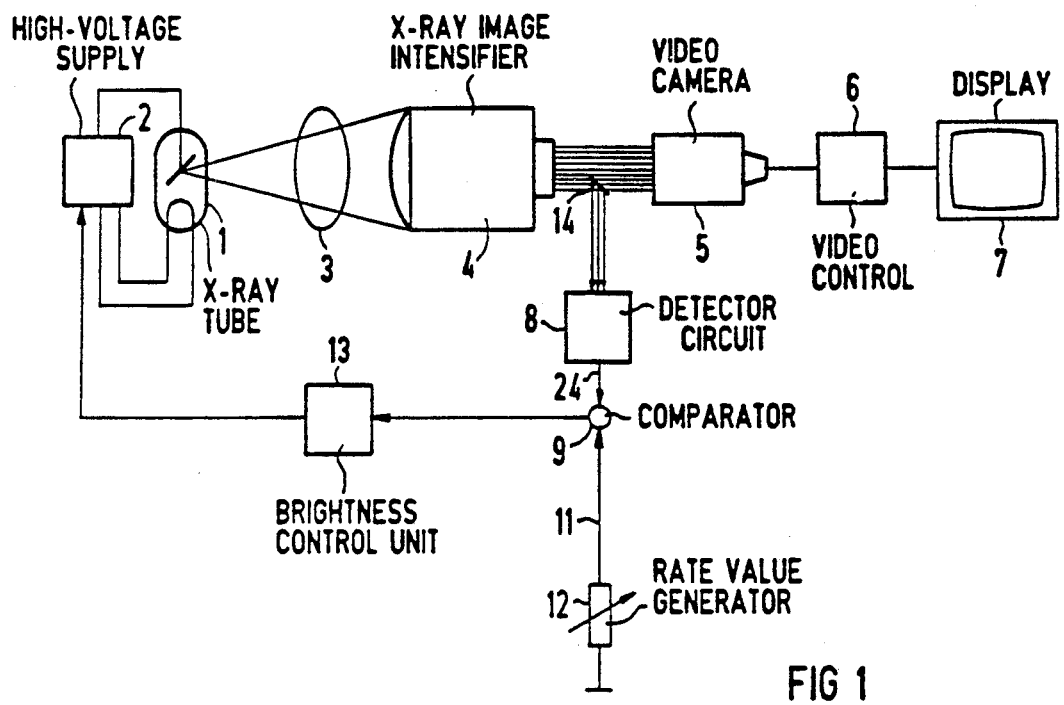
FIG. 1 is a schematic block diagram of an x-ray diagnostics installation of the type in which the invention disclosed herein can be used.

A typical x-ray system is shown in FIG. 1, of the type in which a detector circuit constructed in accordance with the principles of the present invention can be used. The system includes an x-ray tube 1 which is operated by a high-voltage supply 2. A patient 3 is transirradiated with x-rays generated by the x-ray tube 1. X-rays attenuated by the patient 3 are incident on the input screen of an x-ray image intensifier 4. The intensified x-ray image appearing at the output screen of the x-ray image intensifier 4 is picked up by a video camera 5, operated by a central video control 6, and is portrayed on a display 7.

Figure 2:
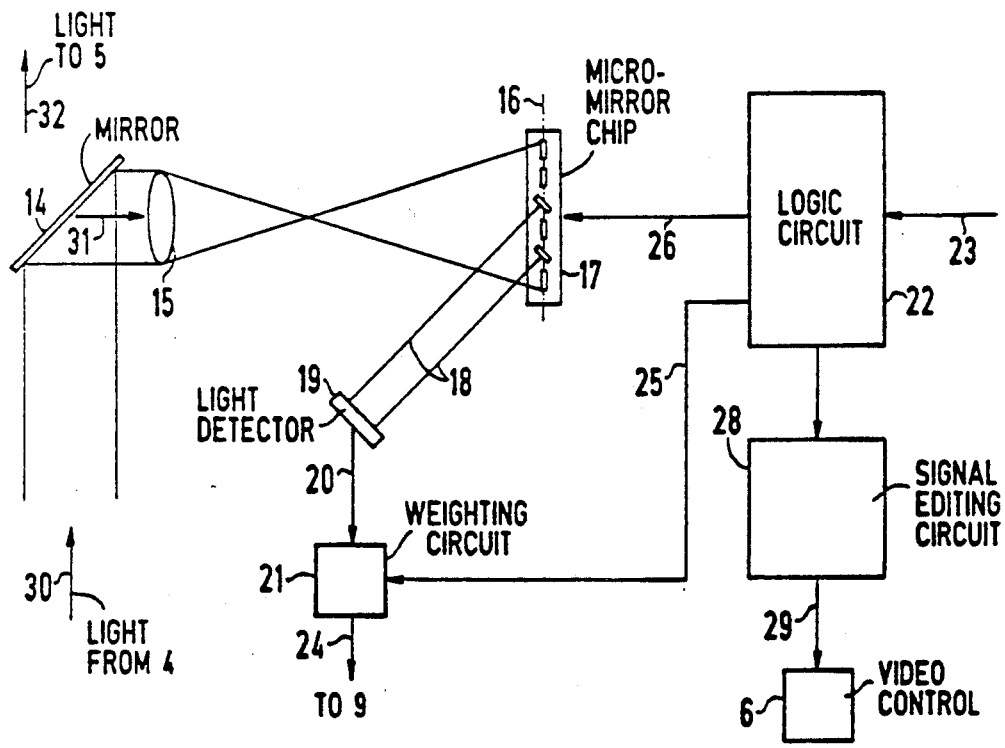
FIG. 2 is a block circuit diagram of a detector circuit constructed in accordance with the principles of the present invention, for use in the system shown in FIG. 1.

In order to maintain the average image brightness in a measuring field of the output screen of the x-ray image intensifier 4 constant, a detector circuit 8, shown in greater detail in FIG. 2, is provided as an actual value generator, which supplies a signal to the actual value input 24 of a comparator 9. The comparator 9 has a rated value input 11 to which a signal corresponding to a rated (desired) value of the average image brightness in the measuring field of the output screen of the x-ray image intensifier 4 is supplied. Depending on the difference between the actual value and the rated value, the high-voltage supply 2 is influenced by a brightness control unit 13 for matching the actual value to the rated value. The rated value is set by an adjustable rated value generator 12.

A part of the light from the x-ray image intensifier 4 is supplied to the detector circuit 8 by a mirror 14 disposed in the telecentric beam path between the output luminescent screen of the x-ray image intensifier 4 and the input of the video camera 5. As shown in FIG. 2, the detector circuit 8 has a light input in which a schematically indicated optical system 15 is disposed so as to portray the output image of the x-ray image intensifier 4 in a plane 16, in which a chip 17 having a plurality of electrically driveable micromirrors is disposed. By driving appropriate ones of the individual micromirrors, portions 18 of the image in the plane 16 can be deflected by the micromirrors onto a light detector 19, which may be any type of photoelement, or photomultiplier. The light detector 19 supplies a signal at an output 20 corresponding to the aggregate luminance of the portions 18 incident on the light detector 19. The signal at the output 20 is supplied to a weighting circuit 21.

A logic circuit 22, such as a computer, receives data identifying the selected measuring field combinations (dominant) at an input 23 and drives the corresponding micromirrors of the chip 17 in accordance with this input data via a line 26. A signal is also generated by the logic circuit 22 at the output 25, which supplies a signal to the weighting circuit 21 based on the number of selected micromirrors. The incoming signal 20 is weighted accordingly in the weighting circuit 21, which generates an output signal 24 which is supplied as an input to the brightness control unit 13, shown in FIG. 1.

For displaying the selected dominant on the display 7, the logic circuit 22 supplies a signal to a signal editing circuit 28 which identifies those micromirrors which have been activated. This signal thus identifies that portion of the total image which has been selected as the dominant. This signal is then edited in the signal editing circuit 28 and is supplied via a line 29 to the central video control 6 in form suitable for causing an image corresponding to the selected portion of the overall image to be portrayed on the display 7.

In FIG. 2, the arrow 30 indicates the direction of the light from the output luminescent screen of the x-ray image intensifier 4, and the arrow 31 indicates that a portion of this light is deflected by the mirror 14 to the detector circuit 8. The arrow 32 indicates that a portion of the light 30 is transmitted to the video camera 5.

The detector circuit shown in FIG. 2 has a rugged structure with relatively few components. Because the chip 17 can be used for other purposes as well, and therefore can be mass-produced, an economical solution is achieved.

In addition to use in a brightness control circuit, the detector shown in FIG. 2 may also be employed in an automatic exposure unit for forming an actual value signal which is used to set the duration of the exposure time.

Although modifications and changes may be suggested by those skilled in the art, it is the intention of the inventor to embody within the patent warranted hereon all changes and modifications as reasonably and properly come within the scope of his contribution to the art.

I claim as my invention:

1. A detector circuit for use in an x-ray diagnostics installation, said x-ray diagnostics installation including an image intensifier video chain having an x-ray tube and an image intensifier with an output screen on which an output image is present, said detector circuit comprising:
   a chip containing a plurality of individually electrically driveable micromirrors, each micromirror changing its orientation within said chip upon being driven;
   means for directing said output image of said x-ray image intensifier onto said micromirrors;
   a light detector; and
   means for selectively driving said micromirrors individually for directing a selected portion of said output image onto said light detector.

2. A detector circuit as claimed in claim 1 further comprising:
   a brightness control circuit for controlling operation of said x-ray tube; and
   means for comparing an output signal from said light detector, as an actual value, to a rated value for generating a brightness control signal for said brightness control circuit.

* * * * *